United States Patent
Tanuma

(10) Patent No.: US 8,007,953 B2
(45) Date of Patent: Aug. 30, 2011

(54) PROCESS FOR PRODUCING MEMBRANE/ELECTRODE ASSEMBLY FOR POLYMER ELECTROLYTE FUEL CELL

(75) Inventor: Toshihiro Tanuma, Chiyoda-ku (JP)

(73) Assignees: Asahi Glass Company, Limited, Tokyo (JP); Panasonic Corporation, Kadoma-shi (JP)

( * ) Notice: Subject to any disclaimer, the term of this patent is extended or adjusted under 35 U.S.C. 154(b) by 591 days.

(21) Appl. No.: 12/110,396

(22) Filed: Apr. 28, 2008

(65) Prior Publication Data

US 2008/0223516 A1    Sep. 18, 2008

Related U.S. Application Data

(63) Continuation of application No. PCT/JP2006/321738, filed on Oct. 31, 2006.

(30) Foreign Application Priority Data

Oct. 31, 2005 (JP) ................... 2005-316489
May 31, 2006 (JP) ................... 2006-151710

(51) Int. Cl.
*H01M 8/10*    (2006.01)

(52) U.S. Cl. ........ 429/483; 429/480; 429/479; 429/492; 429/491; 429/523; 429/534; 429/535

(58) Field of Classification Search ............... 429/479, 429/480, 483, 492, 491, 523, 534, 535
See application file for complete search history.

(56) References Cited

U.S. PATENT DOCUMENTS

| | | |
|---|---|---|
| 2004/0121122 A1 | 6/2004 | Reynolds, III et al. |
| 2005/0181270 A1 | 8/2005 | Sugiura |
| 2006/0019140 A1 | 1/2006 | Kawazoe et al. |

FOREIGN PATENT DOCUMENTS

| | | |
|---|---|---|
| JP | 2003282088 | 10/2003 |
| JP | 2004-158388 | 6/2004 |
| JP | 2004-362875 | 12/2004 |
| JP | 2005-026174 | 1/2005 |
| JP | 2005019298 | 1/2005 |
| JP | 2005078975 | 3/2005 |
| JP | 2005228601 | 8/2005 |
| JP | 2005251419 | 9/2005 |
| JP | 2006-244789 | 9/2006 |
| WO | WO 01/80342 A1 | 10/2001 |

OTHER PUBLICATIONS

U.S. Appl. No. 12/641,960, filed Dec. 18, 2009, Tanuma.
U.S. Appl. No. 12/512,122, filed Jul. 30, 2009, Tanuma.
U.S. Appl. No. 12/859,304, filed Aug. 19, 2010, Tanuma.
U.S. Appl. No. 12/910,935, filed Oct. 25, 2010, Tanuma.

*Primary Examiner* — Laura S Weiner
(74) *Attorney, Agent, or Firm* — Oblon, Spivak, McClelland, Maier & Neustadt, L.L.P.

(57) ABSTRACT

To provide a membrane/electrode assembly for polymer electrolyte fuel cells capable of obtaining a high output voltage even in a high current density region, by providing electrodes having good gas diffusion properties, conductivity, water repellency and durability.

A membrane/electrode assembly for polymer electrolyte fuel cells, comprising; an anode and a cathode each having a catalyst layer containing a catalyst and having a gas diffusion layer; and a polymer electrolyte membrane disposed between the catalyst layer of the anode and the catalyst layer of the cathode, characterized in that at least one of the above anode and cathode, has a carbon layer containing a fluorinated ion exchange resin and carbon nanofibers having a fiber diameter of from 1 to 1,000 nm and a fiber length of at most 1,000 μm, disposed between the catalyst layer and the gas diffusion layer.

18 Claims, No Drawings

PROCESS FOR PRODUCING MEMBRANE/ELECTRODE ASSEMBLY FOR POLYMER ELECTROLYTE FUEL CELL

CROSS-REFERENCE TO RELATED APPLICATIONS

This application is a continuation of PCT/JP2006/321738 filed Oct. 31, 2006 and claims the benefit of JP 2005-316489 filed Oct. 31, 2005 and JP 2006-151710 filed May 31, 2006.

TECHNICAL FIELD

The present invention relates to a process for producing a membrane/electrode assembly for polymer electrolyte fuel cells, whereby a high output voltage can be obtained within a wide range of current densities.

BACKGROUND ART

Attention has been drawn to fuel cells using hydrogen and oxygen, as a power generating system which presents substantially no adverse effects on the global environment because in principle, its reaction product is water only. Among them, in recent years, a polymer electrolyte fuel cell using a proton conductive ion exchange membrane as an electrolyte is expected to be useful for in-vehicle power sources, since its operation temperature is low, its output density is high and it can be downsized.

A polymer electrolyte fuel cell is characterized in that its operation temperature is low (from 50 to 120° C.) as mentioned above. On the other hand, however, it has a difficulty such that exhaust heat can hardly be utilized effectively for e.g. an auxiliary power. In order to offset such a difficulty, the polymer electrolyte fuel cell is required to have a high performance in utilization of hydrogen and oxygen, i.e. high energy efficiency and high output power density.

In order that the polymer electrolyte fuel cell satisfies the above requirement, a gas diffusion electrode (usually composed of a catalyst layer containing a catalyst and a gas diffusion layer comprising e.g. a carbon paper and a carbon cloth) and a membrane/electrode assembly having such electrodes formed on both surfaces of an ion exchange membrane, are particularly important among elements constituting the cell. Heretofore, a catalyst layer of the gas diffusion electrode is prepared from a viscous mixture obtained in such a manner that a catalyst powder for facilitating electrode reaction and a fluorine-containing ion exchange resin for increasing conductivity and preventing clogging (flooding) of a porous body due to condensation of water vapor are dissolved or dispersed in an alcohol solvent such as ethanol. Then, such a viscous mixture is directly applied on the surface of an ion exchange membrane, or separately applied on a substrate sheet to obtain a layer, which is transferred or bonded on the surface of the ion exchange membrane to form a gas diffusion electrode. However, a gas diffusion electrode obtainable in such a manner is not necessarily sufficient for satisfying the gas diffusion property, the electrical conductivity, water repellency and durability, and further, in a case where the above viscous mixture is applied on the ion exchange membrane or the substrate sheet to prepare the gas diffusion electrode, there was such a problem that e.g. the coating property was not necessarily good.

Further, heretofore, a polymer electrolyte fuel cell using such a gas diffusion electrode is not also sufficient for satisfying the properties, and especially, e.g. the output current density is required to be further improved.

In order to solve the above problems, for example, a method has been known, in which a fibrous material such as carbon fiber is incorporated, as a pore-forming agent, in a catalyst layer so as to suppress porosity of electrodes and increase the electrical conductivity at the same time, (see Patent Document 1). However, there has been a problem that it is impossible to obtain a substantially high cell voltage at a high current density by the above method.

Patent Document 1: JP-A-2005-26174

DISCLOSURE OF THE INVENTION

Problems that the Invention is to Solve

It is an object of the present invention to solve problems of a polymer electrolyte fuel cell, particularly conventional difficulties in gas diffusion electrodes, and to provide a membrane/electrode assembly comprising gas diffusion electrodes having good gas diffusion property, electrical conductivity, water repellency and further durability, thereby to obtain a new polymer electrolyte fuel cell excellent in cell characteristics such as output voltage.

Means of Solving the Problems

As a result of extensive studies conducted by the present inventors, it has been found that with respect to the above problems in gas diffusion electrodes of a polymer electrolyte fuel cell, it is possible to improve the gas diffusion property on the surface of an electrode layer by providing a layer having an extremely coarse structure containing a fluorinated ion exchange resin and carbon nanofibers between a catalyst layer and a gas diffusion layer of a cathode in a membrane/electrode assembly and to greatly improve the performance of a polymer electrolyte fuel cell by using such a membrane/electrode assembly. Further, it has been found that also by providing a layer made of carbon nanofibers between a catalyst layer and a gas diffusion layer of an anode, the contact resistance becomes small during operation of the polymer electrolyte fuel cell, whereby the cell performance is improved.

Thus, the present invention provides a membrane/electrode assembly for polymer electrolyte fuel cells, comprising an anode and a cathode each having a catalyst layer containing a catalyst and having a gas diffusion layer; and a polymer electrolyte membrane disposed between the catalyst layer of the anode and the catalyst layer of the cathode, characterized in that at least one of the above anode and the above cathode, has a carbon layer containing a fluorinated ion exchange resin and carbon nanofibers having a fiber diameter of from 1 to 1,000 nm and a fiber length of at most 1,000 μm, disposed between the catalyst layer and the gas diffusion layer.

Further, the present invention provides a process for producing a membrane/electrode assembly for polymer electrolyte fuel cells, comprising an anode and a cathode each having a catalyst layer and a gas diffusion layer; and a polymer electrolyte membrane disposed between the catalyst layer of the anode and the catalyst layer of the cathode, which comprises:

applying a dispersion containing a fluorinated ion exchange resin and carbon nanofibers having a fiber diameter of from 1 to 1,000 nm and a fiber length of at most 1,000 μm, on a substrate, followed by drying to prepare a carbon layer;

applying a coating fluid containing a catalyst and an ion exchange resin thereon, followed by drying to prepare the catalyst layer;

heating and pressing the applied surface while the surface is adjacent to the electrolyte membrane so as to transfer the catalyst layer and the carbon layer on the surface of the above electrolyte membrane; and peeling the substrate;

and disposing the gas diffusion layer so as to be adjacent to the carbon layer, thereby to prepare at least one of the above cathode and the above anode.

Further, the present invention provides a process for producing a membrane/electrode assembly for polymer electrolyte fuel cells, comprising an anode and a cathode each having a catalyst layer and a gas diffusion layer; and a polymer electrolyte membrane disposed between the catalyst layer of the anode and the catalyst layer of the cathode, which comprises:

applying a dispersion containing a fluorinated ion exchange resin and carbon nanofibers having a fiber diameter of from 1 to 1,000 nm and a fiber length of at most 1,000 μm, on the gas diffusion layer, followed by drying to prepare a carbon layer;

applying a coating fluid containing a catalyst and an ion exchange resin thereon, followed by drying to prepare the catalyst layer;

then heating and pressing the applied surface while the surface is adjacent to the electrolyte membrane, thereby hot-pressing the catalyst layer on the surface of the electrolyte membrane to prepare at least one of the above cathode and the above anode.

EFFECTS OF THE INVENTION

According to the present invention, it is possible to obtain a membrane/electrode assembly for polymer electrolyte fuel cells having a high output voltage even in a high current density region or a low current density region.

BEST MODE FOR CARRYING OUT THE INVENTION

The present invention will be further described as follows.

The catalyst layer in the present invention contains a catalyst, preferably an ion exchange resin, particularly preferably a fluorinated ion exchange resin. Here, the fluorinated ion exchange resin may specifically be the same or different from the after-mentioned fluorinated ion exchange resin contained in a carbon layer. As a catalyst, a substance for facilitating an electrode reaction at a fuel electrode and a cathode, may be used, and a metal catalyst of e.g. a platinum group metal such as platinum or an alloy thereof may preferably be mentioned. The metal catalyst may be used as it is in a form of fine particles, but is preferably a supported catalyst having the metal catalyst supported on a carbon support. The carbon support is preferably e.g. carbon black or activated carbon having a specific surface area of at least 200 m²/g. The amount of the metal catalyst supported on the support is preferably from 10 to 70% based on the total mass of the catalyst (which means a total mass of the catalyst and the support, the same applies hereinafter).

The ion exchange capacity of the above-mentioned ion exchange resin is preferably from 0.5 to 2.0 meq/g dry resin, particularly preferably from 0.8 to 1.5 meq/g dry resin from the viewpoint of the electrical conductivity and gas permeability.

Further, the ion exchange resin is preferably made of a perfluorocarbon polymer (which may contain an etheric oxygen atoms), particularly preferably made of a copolymer comprising polymerized units based on tetrafluoroethylene and polymerized units based on a perfluoro vinyl ether having a sulfonic acid group. The above perfluoro vinyl ether having a sulfonic acid group is preferably represented by $CF_2=CF(OCF_2CFX)_m-O_p-(CF_2)_n-SO_3H$. Here, m is an integer of from 0 to 3, n is an integer of from 1 to 12, p is 0 or 1, and X is F or $CF_3$. The following compounds may be mentioned as a preferred examples. In the following formulae, each of q, r and s is an integer of from 1 to 8, and t is an integer of from 1 to 3.

$CF_2=CFO(CF_2)_qSO_3H$

$CF_2=CFOCF_2CF(CF_3)O(CF_2)_rSO_3H$

$CF_2=CF(OCF_2CF(CF_3))_tO(CF_2)_sSO_3H$

The mass ratio of the catalyst to the ion exchange resin in the catalyst layer is preferably catalyst:ion exchange resin=0.4:0.6 to 0.95:0.05 from the viewpoint of the electrical conductivity and water repellency of the electrode. It is particularly preferably from 0.6:0.40 to 0.8:0.2. Here, the mass of the catalyst is one containing a mass of the support in the case of a supported catalyst.

Further, the electrolyte membrane in the present invention may be constituted by a resin similar to the ion exchange resin contained in the catalyst layer, and the resin may be the same or different from the ion exchange resin. Particularly, it is preferably made of a perfluorocarbon polymer having sulfonic acid groups, particularly preferably a polymer comprising repeating units based on the above-mentioned $CF_2=CF(OCF_2CFX)_m-O_p-(CF_2)_n-SO_3H$ and repeating units based on tetrafluoroethylene. The thickness of the electrolyte membrane is preferably approximately from 20 to 80 μm.

Carbon nanofibers constituting the carbon layer in the present invention have a fiber diameter of from 1 to 1,000 nm and a fiber length of at most 1,000 μm. If the fiber diameter is too small, the production cost is likely to be high, and the fiber structure is likely to be broken at the time of dispersion. If the fiber diameter is too large, it is difficult to form an optimum void structure of a carbon layer by coating. If the fiber length is too long, the dispersibility will be deteriorated in a coating fluid for preparing a carbon layer. The fiber diameter is particularly preferably from 10 to 200 nm, and the fiber length is preferably from 5 to 30 μm.

The carbon nanofibers may, for example, be vapor phase-grown carbon fibers, or carbon nanotubes (single wall, double wall, multiwall or cup-stacked-type). Especially, it is preferred to use carbon nanofibers which are fine and have gas electron conductivity. The carbon nanofibers are entangled with a catalytic metal constituting a catalyst layer or with a carbon support as an electron conductive material having a catalytic metal supported thereon at the interface between the carbon layer and the catalyst layer, whereby a fresh electroconductive path will be formed in addition to the electroconductive path formed by point contact of the electroconductive material, and the electron conductivity of the catalyst layer will be improved.

Further, the carbon nanofibers in the present invention are likely to be entangled with one another to form voids in a layer obtainable at the time of coating as a dispersion, and such voids will function as gas channels. In power generation of a fuel cell, water (steam) will be formed in the catalyst layer of the cathode side, and such water will be discharged out of the system through the gas diffusion layer disposed adjacent to the catalyst layer. Here, in the present invention, since a carbon layer having carbon nanofibers as a main body is provided between the catalyst layer and the gas diffusion layer, it is also possible to expect an effect that water formed will be readily removed from the catalyst layer to the carbon layer by capillary action, and a flooding problem during the operation of the electrolyte fuel cell will be solved.

The carbon layer in the present invention contains carbon nanofibers and a fluorinated ion exchange resin. The fluorinated ion exchange resin functions as a binder, and it is not particularly limited so long as it is excellent in the durability in an application to fuel cells. Such a fluorinated ion exchange resin may be the same or different from the above-mentioned fluorinated ion exchange resin contained in the catalyst layer, but such a resin is preferably the same as the fluorinated ion exchange resin contained in the catalyst layer from the viewpoint that the carbon nanofibers are readily dispersed therein. Further, it is also preferred from the viewpoint that the adhesion at the interface between the gas diffusion layer and the catalyst layer is increased. In the carbon layer in the present invention, an appropriate void structure capable of obtaining the above-mentioned effect is formed by the carbon nanofibers and the fluororesin, whereby a membrane/electrode assembly obtainable is excellent in the output characteristics. If carbon particles are used instead of the carbon nanofibers, it is impossible to obtain the appropriate void structure, and therefore it is impossible to obtain the effect as mentioned above.

The mixed ratio of the carbon nanofibers to the fluorinated ion (carbon nanofibers:fluorinated ion exchange resin) exchange resin is preferably in a range of from 1:0.1 to 1:5 in a mass ratio. If the ratio of the fluorinated ion exchange resin is lower than the above range, the dispersibility of the carbon nanofibers will be deteriorated, and the adhesion between the carbon layer and the substrate at the time of preparing a carbon layer is likely to be lowered, thus leading to peeling, whereby the handling will be difficult. Further, if the ratio of the fluorinated ion exchange resin is too large, the porosity of the carbon layer will be small, and sufficient gas diffusion property and water-removing property are not likely to be achieved. The preferred mixed ratio of the carbon nanofibers and the fluorinated ion exchange resin is different depending upon the fiber diameter of the carbon nanofibers since the carbon nanofibers and the fluorinated ion exchange resin are formed into a layer structure as combined, and therefore both of the fiber diameter of the carbon nanofibers and the ratio of the carbon nanofibers to the fluorinated ion exchange resin control the void structure. Namely, in order to obtain an optimum void structure, the ratio of the carbon nanofibers to the fluorinated ion exchange resin varies depending upon the fiber diameter. The ratio of the carbon nanofibers to the fluorinated ion exchange resin is more preferably from 1:0.2 to 1:0.6 in a case where the fiber diameter is from 1 to 100 nm, and more preferably from 1:0.5 to 1:1.3 in a case where the fiber diameter is more than 100 nm and at most 1,000 nm.

The thickness of the carbon layer in the present invention is preferably from 2 to 20 μm. If it is thinner than such a range, sufficient water removal is not likely to be achieved. Further, if it is thinner than such a range, there will be a problem that the contact resistance between the gas diffusion layer and the electrode layer becomes too large, or the structural design of a stack becomes difficult since the membrane/electrode assembly including the gas diffusion layer becomes too thick.

It is preferred that the carbon layer in the present invention has high porosity, and further components (a catalyst layer and an ion exchange resin) of the adjacent catalyst layer are penetrated into some pores of the carbon layer. In order that the components of the catalyst layer be penetrated into the carbon layer, it is possible to apply a method of forming the carbon layer, followed by applying a coating fluid containing the components of the catalyst layer thereon.

If the carbon layer before the catalyst layer is formed thereon and the components of the catalyst layer are not yet penetrated thereinto, has a too low density, cracks are likely to be formed at the time of coating and a coating layer is likely to be brittle in a case where the carbon layer is formed by the after-mentioned coating. Further, if the density is too high, the gas diffusion property and the water-removal property formed tend to be insufficient. The density of the carbon layer is preferably from 0.8 to 1.4 g/cm$^3$, but the optimum range is different depending upon the fiber diameter of the carbon nanofibers. Namely, since the carbon nanofibers and the fluorinated ion exchange resin are formed into a layer structure as combined, the optimum void structure and layer density are determined depending upon their mixed ratio.

In the case where the fiber diameter of the carbon nanofibers is from 1 to 100 nm, the density of the carbon layer is preferably from 1.0 to 1.4 g/cm$^3$, more preferably from 1.1 to 1.3 g/cm$^3$. In the case where the fiber diameter of the carbon nanofibers is more than 100 nm and at most 1,000 nm, the density of the carbon layer is preferably from 0.8 to 1.4 g/cm$^3$, more preferably from 1.0 to 1.2 g/cm$^3$. Here, the density means one obtained by carrying out measurement in the dry state where no water is contained in the carbon layer.

Further, the porosity of the carbon layer is preferably from 30 to 65%, particularly preferably from 35 to 55%. In the case where the fiber diameter is from 1 to 100 nm, the porosity is more preferably from 40 to 50%. If the porosity is too low, the gas diffusion property and the water-removal property formed tend to be insufficient, and if the porosity is too high, the coating layer tends to be brittle.

It is possible to prepare the membrane/electrode assembly of the present invention, for example, as follows. The catalyst layer is prepared from a coating fluid containing a metal catalyst and an ion exchange resin, preferably a coating fluid (hereinafter, referred to as a coating fluid for forming a catalyst layer) containing an ion exchange resin and a catalyst supported on a carbon support. The carbon layer is prepared from a coating fluid (hereinafter referred to as a coating fluid for forming a carbon layer) containing carbon nanofibers and a resin binder. First of all, a coating fluid for forming a carbon layer is applied on a substrate film (substrate), followed by heating. As the substrate film, it is possible to use a plastic film such as a polyethylene terephthalate film or an ethylene/tetrafluoroethylene copolymer film.

It is preferred that the carbon layer obtainable by the coating is prepared to have a density within the above-mentioned range. When a carbon layer has such a density, the carbon layer has a properly high porosity. Then, such a carbon layer is coated with a coating fluid for forming the catalyst layer, followed by drying. At that time, components in the catalyst layer are partly penetrated into void portions of the carbon layer. As a result, an electroconductive path of an electrode layer made of the catalyst layer and the carbon layer is further formed.

Then, lamination is carried out so that an electrolyte membrane be sandwiched between two catalyst layers so that the surfaces having the catalyst layers formed, are adjacent to the electrolyte membrane, followed by hot pressing to bond the catalyst layers on both surfaces of the electrolyte membrane, and then the substrate film is peeled off to prepare an assembly of the membrane and the catalyst layers (having the carbon layer positioned outside each catalyst layer). Here, the carbon layer may be present in both of a cathode and an anode, or may be present in either the cathode or the anode. In the latter case, an electrode layer in which the carbon layer is present may be prepared as mentioned above, and an electrode layer in which the carbon layer is not present, may be prepared in such a manner that a catalyst layer is directly formed on a substrate film without forming a carbon layer. Then, an electrolyte membrane is sandwiched between the respective catalyst layers, followed by hot pressing.

When the formation is carried out as mentioned above, a laminate of catalyst layer/electrolyte membrane/catalyst layer/carbon layer or a laminate of carbon layer/catalyst layer/electrolyte membrane/catalyst layer/carbon layer is prepared, and by disposing gas diffusion layers on both outside surfaces of the laminate, a membrane/electrode assembly is prepared. The gas diffusion layer is usually made of a porous electroconductive material such as a carbon paper, carbon cloth or carbon felt, which facilitates diffusion of gas into a catalyst layer and also functions as a current collector.

As the gas diffusion layer, the carbon paper, carbon cloth, carbon felt or the like may be used as it is, but it is preferred to use one obtained by treating the surface of such a substrate for water repellency by using a dispersion or a solution containing a water-repellent fluororesin. By such treatment for water repellency, it is possible to avoid clogging of pores formed in the gas diffusion layer, which will suppress the gas diffusion, by e.g. water formed in the cathode catalyst layer. In such a case, from the viewpoint of the electrical conductivity of the membrane/electrode assembly, it is more preferred to treat the surface of the gas diffusion layer with a dispersion containing the water-repellent fluororesin and an electrical conductive carbon such as carbon black. As the water-repellent fluororesin, polytetrafluoroethylene may, for example, be mentioned. The surface treated side of the gas diffusion layer is disposed so as to be in contact with the catalyst layer or the carbon layer. Further, in the present specification, the catalyst layer, the carbon layer and the gas diffusion layer, or the catalyst layer and the gas diffusion layer, are generally referred to as an electrode as they are put together. The thickness of the gas diffusion layer is usually preferably from 50 to 400 µm.

Further, as another method for preparing the membrane/electrode assembly of the present invention, there is a method of directly coating a gas diffusion layer with a carbon layer and a catalyst layer, followed by hot-pressing them to a membrane, namely, the following method. The coating fluid for forming a carbon layer is directly applied on the gas diffusion layer, followed by heating and drying to form a carbon layer so as to preferably have a density in the above-mentioned range. Then, a coating fluid for forming a catalyst layer is applied on the carbon layer, followed by drying. At that time, components of the catalyst layer are partly penetrated into the void portions of the carbon layer. As a result, an electroconductive path of an electrode layer made of the catalyst layer and the carbon layer is to be further formed. Then, lamination is carried out so that an electrolyte membrane be sandwiched between two catalyst layers so that the surfaces having the catalyst layers formed are adjacent to the electrolyte membrane, followed by hot-pressing to bond the catalyst layers to both surfaces of the electrolyte membrane. As a result, it is possible to obtain a membrane/electrode assembly having the carbon layer between the gas diffusion layer and the catalyst layer. At that time, the carbon layer may be present in either the anode or the cathode.

Further, as another method for preparing the membrane/electrode assembly of the present invention, there is also a method of directly applying a carbon layer on a gas diffusion layer, and then pressing it against a membrane coated with a catalyst layer, namely, as follows. The coating fluid for forming a carbon layer is directly applied on a gas diffusion layer, and heated and dried to form a carbon layer so that the density is preferably within the above-mentioned range. On the other hand, the coating fluid for forming a catalyst layer is applied on an electrolyte membrane, followed by drying. Then, lamination is carried out so that the catalyst layer and the carbon layer formed on the gas diffusion layer are adjacent to each other, followed by hot-pressing to bond the catalyst layer and the carbon layer, whereby a membrane/electrode assembly having the carbon layer between the gas diffusion layer and the catalyst layer is prepared. Here, the carbon layer may be present in both of the cathode and the anode or either the cathode or the anode. In such a method, components of the catalyst layer will be penetrated into void portions of the carbon layer to some extent at the time of hot pressing, but in order to form an electroconductive path more substantially in an electrode layer, it is preferred to employ the initially described two methods.

On both sides of the membrane/electrode assembly thus obtainable, separators having grooves formed as gas channels are disposed, and a gas containing oxygen is supplied to the positive electrode and a gas containing hydrogen is supplied to the negative electrode from the separators, whereby power generation is carried out.

EXAMPLES

Now, the present invention will be described in detail with reference to Examples (Examples 1, 3, 5 to 8) and Comparative Examples (Examples 2, 4, 9 and 10), but it should be understood that the present invention is by no means restricted thereto.

Firstly, preparation of a catalyst layer or a laminate of the catalyst layer and a carbon layer to be used in each Example and each Comparative Example will be described.

(Preparation of Catalyst Layer (a))

10.0 g of a catalyst (manufactured by Tanaka Kikinzoku Kogyo K.K.) having a platinum/cobalt alloy (platinum:cobalt is 46:5 in a mass ratio) supported on a carbon support (specific surface area: 800 m$^2$/g) so as to be contained in a proportion of 51% based on the total mass of the catalyst, was added to 67.1 g of distilled water, followed by thorough stirring. Further, 23.0 g of ethanol was added, followed by thorough stirring. 49.0 g of a liquid having a $CF_2=CF_2/CF_2=CFOCF_2CF(CF_3)O(CF_2)_2SO_3H$ copolymer (ion exchange capacity: 1.1 meq/g dry resin, hereinafter referred to as copolymer (A)) dispersed in ethanol and having a solid content of 10 mass % (hereinafter, referred to as an ethanol dispersion of copolymer (A)) was added thereto, followed by further mixing and homogenization using a homogenizer to obtain a coating fluid (a) for forming an electrode layer.

Such a coating fluid (a) was applied on a substrate film made of polypropylene by using a bar coater, followed by drying in a dryer at 80° C. for 30 minutes to prepare a catalyst layer (a). Further, by measuring the mass of only the substrate film before forming the catalyst layer (a) and the mass of the substrate film after forming the catalyst layer (a), the amount of platinum per unit area contained in the catalyst layer (a) was calculated to be 0.2 mg/cm$^2$. Such a catalyst layer (a) is regarded as a catalyst layer for a cathode.

(Preparation of Coating Fluid (b) for Preparing Carbon Layer)

31.5 g of ethanol and 58.5 g of distilled water were added to 10.0 g of vapor-grown carbon fiber (tradename: VGCF-H, manufactured by Showa Denko K.K., fiber diameter: about 150 nm, fiber length: 10 to 20 µm), followed by thorough stirring. Added thereto was 50.0 g of an ethanol dispersion of copolymer (A), followed by thorough stirring. Further, mixing and homogenizing were carried out by means of a homogenizer to obtain a coating fluid (b).

(Preparation of Coating Fluid (p) for Preparing Carbon Layer)

31.5 g of ethanol and 58.5 g of distilled water were added to 10.0 g of cup-stack-type carbon nanotube (tradename: Carbere AR50-HT, manufactured by GSI Creos Corporation, fiber diameter: about 90 nm, fiber length: from 20 to 100 μm), followed by thorough stirring. Added thereto was 30.0 g of an ethanol dispersion of copolymer (A), followed by thorough stirring. Further, mixing and homogenizing were carried out by means of a homogenizer to obtain a coating fluid (p).

(Preparation of Coating Fluid (q) for Preparing Carbon Layer)

A dispersion was obtained in the same manner as in Preparation of the coating fluid (p) except that in preparation of the coating fluid (p), the amount of ethanol was changed to 25.0 g, the amount of distilled water was changed to 115.0 g and the amount of an ethanol dispersion of the copolymer (A) was changed to 100.0 g. Such a dispersion was regarded as coating fluid (q).

(Preparation of Catalyst Layer (c))

10.0 g of a catalyst (manufactured by Tanaka Kikinzoku Kogyo K.K.) having platinum supported on a carbon support (specific surface area: 800 m$^2$/g) so as to be contained in a proportion of 50% based on the total mass of the catalyst, was added to 67.5 g of distilled water, followed by thorough stirring. Further, 22.5 g of ethanol was added thereto, followed by thorough stirring. Added thereto was 50.0 g of the ethanol dispersion of copolymer (A). Further, mixing and homogenizing were carried out by a homogenizer to obtain a coating fluid (c) for forming a catalyst layer.

The coating fluid (c) was applied on a substrate film made of polypropylene by using a bar coater, followed by drying in a dryer at 80° C. for 30 minutes to prepare a catalyst layer (c). Further, by measuring the mass of only the substrate film before forming the catalyst layer (c) and the mass of the substrate film after forming the catalyst layer (c), the amount of platinum per unit area contained in the catalyst layer (c) was calculated to be 0.2 mg/cm$^2$.

(Preparation of Electrode Layer (d) (catalyst Layer (a)/Carbon Layer (b)))

The coating fluid (b) was applied on a substrate film made of polypropylene by means of a bar coater, followed by drying in a dryer at 80° C. for 30 minutes to prepare a carbon layer (b). Further, by measuring the mass of only the substrate film before forming the carbon layer (b) and the mass of the substrate film after forming the carbon layer (b), the amount of the solid content of the carbon layer (b) was calculated to be 0.6 mg/cm$^2$, the thickness of the carbon layer (b) was about 6 μm, and the density was 1.1 mg/cm$^3$.

On the carbon layer (b), the coating fluid (a) was applied by means of a bar coater, followed by drying in a dryer at 80° C. for 30 minutes to prepare an electrode layer. When the cross section of the electrode layer was observed by an electron microscope, it was found that components of the catalyst layer (a) were partly penetrated into void portions of the carbon layer (b). An electrode layer with a two-layered structure comprising the carbon layer (b) and a layer corresponding to the catalyst layer (a) formed thereon, is regarded as an electrode layer (d). Further, by measuring the mass of a substrate before and after applying the coating fluid (a) thereon, the amount of platinum per unit area contained in the electrode layer (d), was calculated to be 0.2 mg/cm$^2$.

(Preparation of Electrode Layer (d2) (Catalyst Layer (a)/Carbon Layer (b)))

An electrode layer (d2) constituted by two layers formed from a carbon layer (b2) and a layer corresponding to the catalyst layer (a) formed thereon, was prepared in the same manner as in the preparation of the electrode layer (d) except that the coating amount of the coating fluid (b) was changed, the amount of the solid content in a layer (hereinafter referred to as a carbon layer (b2)) obtainable was changed to 0.3 mg/cm$^2$, and the thickness was changed to about 6 μm. When the cross section of the electrode layer (d2) was observed by an electron microscope, it was found that components of a catalyst layer (a) were partly penetrated into void portions of the carbon layer (b2). Further, the density of the carbon layer (b2) before applying and forming the catalyst layer (a) was found to be 1.1 g/cm$^3$.

(Preparation of Electrode Layer (e) (Catalyst Layer (c)/Carbon Layer (b)))

A carbon layer (b) was prepared by using the coating fluid (b) in the same manner as in the preparation of the carbon layer (b) in the electrode layer (d). On the carbon layer (b), the coating fluid (c) was applied by using a bar coater, followed by drying in a dryer at 80° C. for 30 minutes to prepare an electrode layer. When the cross section of the electrode layer was observed by an electron microscope, and it was found that components of the catalyst layer (c) were partly penetrated into void portions of the carbon layer (b). The two-layer structured electrode layer comprising the carbon layer (b) and a layer corresponding to the catalyst layer (c) formed thereon, is regarded as an electrode layer (e). Further, by measuring the mass of the substrate before and after application of the coating fluid (c) thereon, the amount of platinum per unit area contained in the electrode layer (e) was calculated to be 0.2 mg/cm$^2$.

(Preparation of Electrode Layer (m) (a Layer Formed from a Mixture of Coating Fluids (a) and (b)))

The coating fluid (a) and the coating fluid (b) were mixed in a mass ratio of 1.08:1, followed by thorough stirring. An electrode layer (m) having a platinum in an amount of 0.2 mg/cm$^2$ was prepared by a preparation method in the same manner as in the catalyst layer (a) except that such a liquid was used instead of the coating fluid (a).

(Preparation of Electrode Layer (r) (Catalyst Layer (c)/Carbon Layer (p)))

A carbon layer (p) was prepared by using the coating fluid (p) in the same manner as in the preparation of the carbon layer (b) in the electrode layer (d). On the carbon layer (p), the coating fluid (c) was applied by using a bar coater, followed by drying in a dryer at 80° C. for 30 minutes to prepare an electrode layer. When the cross section of the electrode layer was observed by an electron microscope, it was found that components of the catalyst layer (c) were partly penetrated into void portions of the carbon layer (p). The two-layer structured electrode layer comprising the carbon layer (p) and a layer corresponding to the catalyst layer (c) formed thereon, is regarded as an electrode layer (r). Further, by measuring the mass of a substrate before and after applying the coating fluid (c) thereon, the amount of platinum per unit area contained in the electrode layer (r) was calculated to be 0.2 mg/cm$^2$.

(Preparation of Electrode Layer (s) (Catalyst Layer(c)/Carbon Layer (q)))

A carbon layer (q) was prepared by using the coating fluid (q) in the same manner as in the preparation of the carbon layer (b) in the electrode layer (d). On the carbon layer (q), the coating fluid (c) was applied by using a bar coater, followed by drying in a dryer at 80° C. for 30 minutes to prepare an electrode layer. When the cross section of the electrode layer was observed by an electron microscope, it was found that components of the catalyst layer (c) were partly penetrated into void portions of the carbon layer (q). The two-layer structured electrode layer comprising the carbon layer (q) and a layer corresponding to the catalyst layer (c) formed thereon, is regarded as an electrode layer (s). Further, by measuring the mass of a substrate before and after applying a coating fluid (c) thereon, the amount of platinum per unit area contained in the electrode layer (s) was calculated to be 0.2 mg/cm$^2$.

(Preparation of Electrode Layer (t) (Catalyst Layer (a2)/Carbon Layer (p)))

A carbon layer (p) was prepared by using the coating fluid (p) in the same manner as in the preparation of the carbon layer (b) in the electrode layer (d). On the carbon layer (p), the coating fluid (a2) was applied by using a bar coater, followed by drying in a dryer at 80° C. for 30 minutes to prepare an electrode layer. When the cross section of the electrode layer was observed by an electron microscope, it was found that components of the catalyst layer (a2) were partly penetrated into void portions of the carbon layer (p). The two-layer structured electrode layer comprising the carbon layer (p) and a layer corresponding to the catalyst layer (a2) formed thereon, is regarded as an electrode layer (t). By measuring the mass of a substrate before and after applying the coating fluid (a2) thereon, the amount of platinum per unit area, contained in the electrode layer (t), was calculated to be 0.2 mg/cm$^2$.

(Preparation of Electrode Layer (u) (Catalyst Layer (a2)/Carbon Layer (q)))

The carbon layer (q) was prepared by using the coating fluid (q) in the same manner as in the preparation of the carbon layer (b) in the electrode layer (d). On the carbon layer (q), the coating fluid (a2) was applied by using a bar coater, followed by drying in a dryer at 80° C. for 30 minutes to prepare an electrode layer. When the cross section of the electrode layer was observed by an electron microscope, it was found that components of the catalyst layer (a2) were partly penetrated into void portions of the carbon layer (q). The two-layer structured electrode layer comprising the carbon layer (q) and a layer corresponding to the catalyst layer (a2) formed thereon, is regarded as an electrode layer (u). Further, by measuring the mass of a substrate before and after applying the coating fluid (a2) thereon, the amount of platinum per unit area contained in the electrode layer (u), was calculated to be 0.2 mg/cm$^2$.

Example 1

Example of the Present Invention

Using, as a polymer electrolyte membrane, an ion exchange membrane having a thickness of 30 μm, made of a perfluorocarbon polymer having sulfonic acid groups (tradename: FLEMION, manufactured by Asahi Glass Company, Limited, ion exchange capacity: 1.1 meq/g dry resin), the catalyst layer (c) formed on a substrate film was disposed on one side of the membrane as an anode catalyst layer, and one having the electrode layer (d) formed thereon was disposed on another side as a cathode catalyst layer. In such a laminate, the cathode catalyst layer and the anode catalyst layer were transferred on the membrane by hot pressing, and then the substrate films were peeled off to prepare a membrane/catalyst layer assembly made of a polymer electrolyte membrane and two catalyst layers having an electrode area of 25 cm$^2$.

The membrane/catalyst layer assembly obtained was sandwiched between two gas diffusion layers made of a carbon cloth with a thickness of 350 μm to prepare a membrane/electrode assembly. Such a membrane/electrode assembly was mounted in a cell for power generation, hydrogen (utilization ratio: 70%)/air (utilization ratio: 40%) were supplied under ambient pressure, and the cell voltages at the initial stage of the operation at a cell temperature of 80° C. and at a current density of each of 0.2 A/cm$^2$ and 1.5 A/cm$^2$ were measured. Further, hydrogen with a dew point of 80° C. was supplied to the anode side, and air with a dew point of 80° C was supplied to the cathode side, respectively in the cell, whereupon the cell voltage at the initial stage of the operation was measured. The results are shown in Table 1.

Example 2

Comparative Example

A membrane/catalyst layer assembly having an electrode area of 25 cm$^2$ was prepared in the same manner as in Example 1 and a membrane/electrode assembly was prepared in the same manner as in Example 1 except that the catalyst layer (a) was used as a cathode catalyst layer. Regarding such a membrane/electrode assembly, the cell voltages at the initial stage of the operation were measured under the same conditions as in Example 1. The results are shown in Table 1.

Example 3

Example of the Invention

A membrane/catalyst layer assembly having an electrode area of 25 cm$^2$ was prepared in the same manner as in Example 1 except that the electrode layer (d2) was used instead of the electrode layer (d) as a catalyst layer of a cathode. By using such a membrane/catalyst layer assembly, a membrane/electrode assembly was prepared in the same manner as in Example 1, and the cell voltages at the initial stage of the operation were measured under the same conditions as in Example 1. The results are shown in Table 1.

Example 4

Comparative Example

A membrane/catalyst layer assembly having an electrode area of 25 cm$^2$ was prepared in the same manner as in Example 1 except that the electrode layer (m) was used instead of the electrode layer (d) as a catalyst layer of a cathode. By using such a membrane/catalyst layer assembly, a membrane/electrode assembly was prepared in the same manner as in Example 1, and the cell voltages at the initial stage of the operation were measured under the same conditions as in Example 1. The results are shown in Table 1.

Example 5

Example of the Invention

A membrane/catalyst layer assembly having an electrode area of 25 cm$^2$ was prepared in the same manner as in Example 1 except that the electrode layer (e) was used instead of the catalyst layer (c) as a catalyst layer of an anode. By using such a membrane/catalyst layer assembly, a membrane/electrode assembly was prepared in the same manner as in Example 1, and the cell voltages at the initial stage of the operation were measured under the same conditions as in Example 1. The results are shown in Table 1.

TABLE 1

| | Cell voltage (V) | |
| --- | --- | --- |
| | 0.2 A/cm$^2$ | 1.5 A/cm$^2$ |
| Ex. 1 | 0.78 | 0.45 |
| Ex. 2 | 0.76 | 0 |
| Ex. 3 | 0.78 | 0.39 |
| Ex. 4 | 0.77 | 0.29 |
| Ex. 5 | 0.78 | 0.47 |

(Preparation of Catalyst Layer (a2))

A coating fluid (a2) for forming an electrode layer having a catalyst dispersed therein was prepared in the same manner as in the coating fluid (a) for forming an electrode layer except that distilled water was used in an amount of 93.9 g, an ethanol dispersion of the copolymer (A) having a concentration of 12 mass % was used in an amount of 40.8 g and ethanol was used in an amount of 4.3 g. By using such a coating fluid (a2), a catalyst layer (a2) was prepared in the same manner as in the catalyst layer (a).

(Preparation of Coating Fluid for Preparing Carbon Layer (b'))

A coating fluid (b') was prepared in the same manner as in the coating fluid (b) except that 90.0 g of distilled water instead of ethanol was added to 10.0 g of carbon fiber grown in a gas phase, and 130.0 g of an ethanol dispersion of the copolymer (A) having a concentration of 10 mass % was added thereto.

(Preparation of Electrode Layer (f) (Catalyst Layer (a2)/Carbon Layer (b3))

By using the coating fluid (b') instead of the coating fluid (b), a carbon layer (b3) was prepared in the same manner as in the preparation of the carbon layer (b). The amount of the solid content of the carbon layer (b3) was 0.6 mg/cm$^2$, the thickness of the carbon layer (b3) was about 7 μm and the density thereof was 1.1 mg/cm$^3$.

On the carbon layer (b3), the coating fluid (a2) was applied by using a bar coater, followed by drying in a dryer at 80° C. for 30 minutes to prepare an electrode layer. When the cross section of the electrode layer was observed by an electron microscope, components of the catalyst layer (a2) were partly penetrated into void portions of the carbon layer (b3). The two-layer structured electrode layer comprising the carbon layer (b3) and a layer corresponding to the catalyst layer (a2) formed thereon, is regarded as an electrode layer (f). Further, by measuring the mass of the substrate before and after applying the coating fluid (a2) thereon, the amount of platinum per unit area contained in the electrode layer (d) was calculated to be 0.2 mg/cm$^2$.

(Preparation of Electrode Layer (g) (Catalyst Layer (c)/Carbon Layer (b3)))

The carbon layer (b3) was prepared by using the coating fluid (b') in the same manner as in the preparation of the carbon layer (b) in the electrode layer (d). On the carbon layer (b3), the coating fluid (c) was applied by using a bar coater, followed by drying in a dryer at 80° C. for 30 minutes to prepare an electrode layer. When the cross section of the electrode layer was observed by an electron microscope, components of the catalyst layer (c) were partly penetrated into void portions of the carbon layer (b3). The two-layer structured electrode layer comprising the carbon layer (b3) and a layer corresponding to the catalyst layer (c) formed thereon, is regarded as an electrode layer (g). Further, by measuring the mass of the substrate before and after applying the coating fluid (c) thereon, the amount of platinum per unit area contained in the electrode layer (g) was calculated to be 0.2 mg/cm$^2$.

Example 6

Example of the Invention

A membrane/catalyst layer assembly having an electrode area of 25 cm$^2$ was prepared in the same manner as in Example 1 except that as a cathode catalyst layer, the electrode layer (f) was used instead of the electrode layer (d). By using such a membrane/catalyst layer assembly, a membrane/electrode assembly was prepared in the same manner as in Example 1, and the cell voltages at the initial stage of the operation were measured under the same conditions as in Example 1. The results are shown in Table 2.

Example 7

Example of the Invention

A membrane/catalyst layer assembly having an electrode area of 25 cm$^2$ was prepared in the same manner as in Example 6 except that as an anode catalyst layer, the electrode layer (9) was used instead of the catalyst layer (c). By using such a membrane/catalyst layer assembly, a membrane/electrode assembly was prepared in the same manner as in Example 1, and the cell voltages at the initial stage of the operation were measured under the same conditions as in Example 1. The results are shown in Table 2.

Example 8

Example of the Invention

On a gas diffusion layer (tradename: GDL-25BC, manufactured by SGL Carbon AG) made of a carbon paper coated with a coating fluid containing a carbon and polytetrafluoroethylene on the surface, the coating fluid (b') was applied by using a die coater so that the solid content would be 0.8 mg/cm$^2$, followed by drying. Then, the coating fluid (a2) was applied thereon by using a die coater so that the amount of platinum would be 0.2 mg/cm$^2$, followed by drying to obtain an electrode layer (h). Similarly, by using the same gas diffusion layer as the above, the coating fluid (b') was applied thereon by using a die coater so that the solid content would be 0.8 mg/cm$^2$, followed by drying. Then, the coating fluid (c) was further applied thereon by using a die coater so that the platinum amount would be 0.2 mg/cm$^2$, followed by drying to obtain an electrode layer (j).

A membrane/catalyst layer assembly having an electrode area of 25 cm$^2$ was prepared in the same manner as in Example 1 except that as a cathode catalyst layer, the catalyst layer (h) was used instead of the electrode layer (d), and as an anode catalyst layer, the electrode layer (j) was used instead of the catalyst layer (c). By using such a membrane/catalyst layer assembly, a membrane/electrode assembly was prepared in the same manner as in Example 1, and the cell voltages at the initial stage of the operation were measured under the same conditions as in Example 1. The results are shown in Table 2.

Example 9

Comparative Example

By using the same gas diffusion layer as in Example 8, the coating fluid (a2) was applied thereon by using a die coater so that the amount of platinum would be 0.2 mg/cm², followed by drying to obtain an electrode layer (h2). Similarly, by using the same gas diffusion layer as the above, the coating fluid (c) was applied thereon by using a die coater so that the platinum amount would be 0.2 mg/cm², followed by drying to obtain an electrode layer (j2).

A membrane/catalyst layer assembly having an electrode area of 25 cm² was prepared in the same manner as in Example 1 except that as a cathode catalyst layer, the catalyst layer (h2) was used instead of the electrode layer (d), and as an anode catalyst layer, the electrode layer (j2) was used instead of the catalyst layer (c). By using such a membrane/catalyst layer assembly, a membrane/electrode assembly was prepared in the same manner as in Example 1, and the cell voltages at the initial stage of the operation were measured under the same conditions as in Example 1. The results are shown in Table 2.

Example 10

Comparative Example 90.0 g of distilled water was added to 10.0 g of carbon black (tradename: Vulcan XC72, manufactured by Cabot Corporation), followed by thorough stirring. Added thereto was 130.0 g of the ethanol dispersion of the copolymer (A), followed by thorough stirring. Further, mixing and homogenizing were carried out by using a homogenizer to obtain a coating fluid (k).

The coating fluid (k) was applied on a substrate film made of polypropylene by means of a bar coater, followed by drying in a dryer at 80° C. for 30 minutes to prepare a carbon black layer (k). The amount of the solid content of the carbon black layer (k) was calculated in the same manner as in the carbon layer (b) and found to be 0.6 mg/cm², the thickness was found to be about 5 μm, and the density was found to be 1.2 mg/cm³.

On the carbon black layer (k), the coating fluid (a2) was applied by using a bar coater, followed by drying in a dryer at 80° C. for 30 minutes to prepare an electrode layer. When the cross section of the electrode layer was observed by an electron microscope, components of the catalyst layer (a2) were partly penetrated into void portions of the carbon black layer (k). The two-layer structured electrode layer comprising the carbon black layer (k) and a layer corresponding to the catalyst layer (a2) formed thereon, is regarded as an electrode layer (n). Further, by measuring the mass of the substrate before and after applying the coating fluid (a2) thereon, the amount of platinum per unit area contained in the electrode layer (n) was calculated and found to be 0.2 mg/cm².

A membrane/catalyst layer assembly having an electrode area of 25 cm² was prepared in the same manner as in Example 1 except that as a cathode catalyst layer, the electrode layer (n) was used instead of the electrode layer (d), and as an anode catalyst layer, the electrode layer (j) was used instead of the catalyst layer (c). By using such a membrane/catalyst layer assembly, a membrane/electrode assembly was prepared in the same manner as in Example 1, and the cell voltages at the initial stage of the operation were measured under the same conditions as in Example 1. The results are shown in Table 2.

Example 11

Example of the Present Invention

A membrane/catalyst layer assembly having an electrode area of 25 cm² was prepared in the same manner as in Example 1 except that as a cathode catalyst layer, the electrode layer (t) was used instead of the electrode layer (d), and as an anode catalyst layer, the electrode layer (r) was used instead of the catalyst layer (c). By using such a membrane/catalyst layer assembly, a membrane/electrode assembly was prepared in the same manner as in Example 1, and the cell voltages at the initial stage of the operation were measured under the same conditions as in Example 1. The results are shown in Table 2.

Example 12

Example of the Present Invention

A membrane/catalyst layer assembly having an electrode area of 25 cm² was prepared in the same manner as in Example 1 except that as a cathode catalyst layer, the electrode layer (u) was used instead of the electrode layer (d), and as an anode catalyst layer, the electrode layer (s) was used instead of the catalyst layer (c). By using such a membrane/catalyst layer assembly, a membrane/electrode assembly was prepared in the same manner as in Example 1, and the cell voltage at the initial stage of the operation was measured under the same conditions as in Example 1. The results are shown in Table 2.

TABLE 2

| | Cell voltage (V) | |
|---|---|---|
| | 0.2 A/cm² | 1.5 A/cm² |
| Ex. 6 | 0.78 | 0.49 |
| Ex. 7 | 0.78 | 0.50 |
| Ex. 8 | 0.79 | 0.49 |
| Ex. 9 | 0.76 | 0 |
| Ex. 10 | 0.78 | 0.32 |
| Ex. 11 | 0.79 | 0.50 |
| Ex. 12 | 0.78 | 0.38 |

It is evident that by using the membrane/electrode assembly of the present invention, it is possible to obtain a high output voltage in each of the low current density region and the high current density region.

INDUSTRIAL APPLICABILITY

According to the present invention, it is possible to provide a membrane/electrode assembly for polymer electrolyte fuel cells capable of obtaining a high output voltage in each of the low current density region and the high output density region, and therefore it is very useful for fuel cells in application to various power sources for stationary use or automobile use.

The entire disclosures of Japanese Patent Application No. 2005-316489 filed on Oct. 31, 2005 and Japanese Patent Application No. 2006-151710 filed on May 31, 2006 including specifications, claims, drawings and summaries are incorporated herein by reference in their entireties.

What is claimed is:

1. A membrane/electrode assembly for polymer electrolyte fuel cells, comprising an anode and a cathode each having a catalyst layer containing a catalyst and having a gas diffusion layer; and a polymer electrolyte membrane disposed between the catalyst layer of the anode and the catalyst layer of the cathode, wherein at least one of the anode and the cathode has a carbon layer containing a fluorinated ion exchange resin and carbon nanofibers having a fiber diameter of from 1 to 1,000 nm and a fiber length of 5 μm to at most 1,000 μm disposed between the catalyst layer and the gas diffusion layer, wherein the carbon nanofibers and the fluorinated ion exchange resin are contained in a mass ratio of from 1:0.1 to 1:5 in the carbon layer.

2. The membrane/electrode assembly for polymer electrolyte fuel cells according to claim 1, wherein the fiber diameter of the carbon nanofibers is from 100 to 1,000 nm, the mass ratio of the carbon nanofibers to the fluorinated ion exchange resin in the carbon layer is from 1:0.5 to 1:1.3, and the carbon layer has a density of from 0.8 to 1.4 g/cm$^3$.

3. The membrane/electrode assembly for polymer electrolyte fuel cells according to claim 1, wherein the carbon layer has a thickness of from 2 to 20 μm.

4. The membrane/electrode assembly for polymer electrolyte fuel cells according to claim 1, wherein a component of the catalyst layer is penetrated into the carbon layer.

5. The membrane/electrode assembly for polymer electrolyte fuel cells according to claim 1, wherein the gas diffusion layer has its surface treated for water repellency by a dispersion containing carbon black and polytetrafluoroethylene.

6. The membrane/electrode assembly for polymer electrolyte fuel cells according to claim 1, wherein the fluorinated ion exchange resin has an ion capacity of from 0.5 to 2.0 meg/g dry resin.

7. The membrane/electrode assembly for polymer electrolyte fuel cells according to claim 1, wherein the fluorinated ion exchange resin comprises a perfluorocarbon polymer.

8. The membrane/electrode assembly for polymer electrolyte fuel cells according to claim 1, wherein the catalyst is a platinum group metal catalyst.

9. The membrane/electrode assembly for polymer electrolyte fuel cells according to claim 8, wherein the catalyst is supported on a carbon support.

10. The membrane/electrode assembly for polymer electrolyte fuel cells according to claim 9, wherein the carbon support is carbon black or activated carbon having a specific surface area of at least 200 m$^2$/g.

11. The membrane/electrode assembly for polymer electrolyte fuel cells according to claim 1, wherein the polymer electrolyte membrane comprises a perfluorocarbon polymer having sulfonic acid groups.

12. The membrane/electrode assembly for polymer electrolyte fuel cells according to claim 1, wherein the carbon nanofibers have a fiber diameter of from 10 to 200 nm and a fiber length of 5 to 30 μm.

13. The membrane/electrode assembly for polymer electrolyte fuel cells according to claim 1, wherein the carbon nanofibers and the fluorinated ion exchange resin are contained in a mass ratio of from 1:0.2 to 1:0.6 in the carbon layer when the fiber diameter is from 1 to 100 nm.

14. The membrane/electrode assembly for polymer electrolyte fuel cells according to claim 1, wherein the carbon nanofibers and the fluorinated ion exchange resin are contained in a mass ratio of from 1:0.5 to 1:1.3 in the carbon layer when the fiber diameter is from more than 100 nm and at most 1,000 nm.

15. A process for producing a membrane/electrode assembly for polymer electrolyte fuel cells, comprising an anode and a cathode each having a catalyst layer and a gas diffusion layer; and a polymer electrolyte membrane disposed between the catalyst layer of the anode and the catalyst layer of the cathode, which comprises: applying a dispersion containing a fluorinated ion exchange resin and carbon nanofibers having a fiber diameter of from 1 to 1,000 nm and a fiber length of 5 μm to 1,000 μm, on a substrate, followed by drying to prepare a carbon layer; applying a coating fluid containing a catalyst and an ion exchange resin thereon, followed by drying to prepare the catalyst layer; heating and pressing the applied surface while the surface is adjacent to the electrolyte membrane so as to transfer the catalyst layer and the carbon layer on the surface of the above electrolyte membrane; and peeling the substrate; and disposing the gas diffusion layer so as to be adjacent to the carbon layer, thereby to prepare at least one of the above cathode and the above anode, wherein the carbon nanofibers and the fluorinated ion exchange resin are contained in a mass ratio of from 1:0.1 to 1:5 in the carbon layer.

16. The process for producing a membrane/electrode assembly for polymer electrolyte fuel cells according to claim 15, wherein the carbon layer has a density of from 0.8 to 1.4 g/cm$^3$ in a state before the coating fluid is applied to form a catalyst layer.

17. A process for producing a membrane/electrode assembly for polymer electrolyte fuel cells, comprising an anode and a cathode each having a catalyst layer and a gas diffusion layer; and a polymer electrolyte membrane disposed between the catalyst layer of the anode and the catalyst layer of the cathode, which comprises: applying a dispersion containing a fluorinated ion exchange resin and carbon nanofibers having a fiber diameter of from 1 to 1,000 nm and a fiber length of 5 μm to 1,000 μm, on the gas diffusion layer, followed by drying to prepare a carbon layer; applying a coating fluid containing a catalyst and an ion exchange resin thereon, followed by drying to prepare the catalyst layer; then heating and pressing the applied surface while the surface is adjacent to the electrolyte membrane, thereby hot-pressing the catalyst layer on the surface of the electrolyte membrane to prepare at least one of the above cathode and the above anode, wherein the carbon nanofibers and the fluorinated ion exchange resin are contained in a mass ratio of from 1:0.1 to 1:5 in the carbon layer.

18. The process for producing a membrane/electrode assembly for polymer electrolyte fuel cells according to claim 17, wherein the carbon layer has a density of from 0.8 to 1.4 g/cm$^3$ in a state before the coating fluid is applied to form a catalyst layer.

* * * * *